United States Patent
Good et al.

(10) Patent No.: US 7,460,968 B1
(45) Date of Patent: Dec. 2, 2008

(54) METHOD AND APPARATUS FOR SELECTING WAFERS FOR SAMPLING

(75) Inventors: Richard P. Good, Dresden (DE);
Matthew A. Purdy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/239,814

(22) Filed: Sep. 30, 2005

(51) Int. Cl.
*G06F 19/00* (2006.01)

(52) U.S. Cl. .................. 702/83; 702/84; 702/183; 702/184; 700/108; 700/109; 700/110; 700/121

(58) Field of Classification Search ............ 702/83, 702/84, 183, 184; 700/121, 108–110
See application file for complete search history.

(56) References Cited

U.S. PATENT DOCUMENTS 7,089,075 B2 * 8/2006 Hasan .................. 700/121
2003/0169064 A1 * 9/2003 Pirkle et al. ............ 324/765
2005/0033467 A1 2/2005 Purdy .................... 700/109

OTHER PUBLICATIONS

Cunningham, Sean Patrick. "The Development and Use of In-line Yield Estimates in Semiconductor Manufacturing", 1995.*

* cited by examiner

*Primary Examiner*—Tung S Lau
*Assistant Examiner*—Sujoy K Kundu
(74) *Attorney, Agent, or Firm*—Williams, Morgan & Amerson

(57) ABSTRACT

The present invention provides a method and apparatus for selecting wafers for sampling. The method includes determining a plurality of sampling rules associated with at least one of a plurality of wafers and selecting at least one wafer for sampling based on the plurality of sampling rules.

25 Claims, 3 Drawing Sheets

METHOD AND APPARATUS FOR SELECTING WAFERS FOR SAMPLING

BACKGROUND OF THE INVENTION

1. Field of the Invention

This invention relates generally to semiconductor processing, and, more particularly, to selecting wafers for sampling during semiconductor processing.

2. Description of the Related Art

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe so that a desired product is formed in or on the wafer. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. When processing of the wafer is complete, the various features formed in or on the wafer, as well as features formed in or on layers that are deposited above the wafer, combine to form the desired product. Exemplary products include processors, memory elements, and the like.

The semiconductor fabrication facility typically also includes metrology tools for collecting data indicative of the physical state of one or more wafers before, during, and/or after processing by the processing tools. Collecting the data indicative of the physical state of a wafer using a metrology tool is conventionally referred to as "sampling" the wafer. Data collected by the metrology tools may be used to characterize the wafer, to detect faults associated with the processing, and/or to determine (or predict) the quality of the finished product. For example, a mean critical dimension associated with the various features, e.g. gate electrode structures, may be indicative of a performance level of products formed on the wafer and/or the wafer lot. If the wafer state data indicates that the mean critical dimension associated with the feature, e.g. a gate electrode, is on the lower end of an allowable range for such feature sizes, then this may indicate that the product formed on the wafer may exhibit relatively high performance levels. For example, smaller feature sizes in a processor formed on the wafer may be associated with faster processing speeds. Higher performance products may be sold at a higher price, thereby increasing the profitability of the manufacturing operation.

High-volume semiconductor fabrication facilities may process hundreds or even thousands of wafer lots every week. Sampling every processed wafer (or wafer lot) may significantly reduce the efficiency of the semiconductor fabrication facility, at least in part because metrology generally takes longer than processing. Accordingly, only a portion of the wafers processed in the facility are typically sampled. For example, a wafer lot including 25 wafers may be processed using a three-chambered etching tool. To monitor the operation of each chamber of the etching tool, an engineer may select particular slots in a run to be sampled by a metrology tool and include these selections in a sampling plan. If the wafers are provided to the chambers of the etching tool sequentially, one possible sampling plan could be to perform metrology on the first wafer, which should be provided to the first chamber, on the 11th wafer, which should be provided to the second chamber, and on the 24th wafer, which should be provided to the third chamber.

Static sampling plans, such as the one described above, are appropriate as long as the manufacturing environment in the semiconductor fabrication facility is also static. However, the manufacturing environment is typically not static and changes in the manufacturing environment may cause metrology tools operating according to the static sampling plan to sample a less desirable subset of the wafers. For example, the metrology tool cannot sample the 24th wafer, as indicated by the static sampling plan, if the number of wafers in the lot changes from 25 to 20. Consequently, wafers processed by the third chamber of the etching tool will not be sampled and engineers will have no indication of whether or not the third chamber of the etching tool is operating correctly. Engineers may be able to change the sampling plan manually, but manual intervention is time-consuming, labor-intensive, and may reduce the efficiency of the semiconductor fabrication facility. Furthermore, engineers may not be aware of the changes in the manufacturing environment until many wafers and/or wafer lots have been processed using the incorrect, undesirable, or non-optimal static sampling plan.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for selecting wafers for sampling. The method includes determining a plurality of sampling rules associated with at least one of a plurality of wafers and selecting at least one wafer for sampling based on the plurality of sampling rules.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Figure 1:
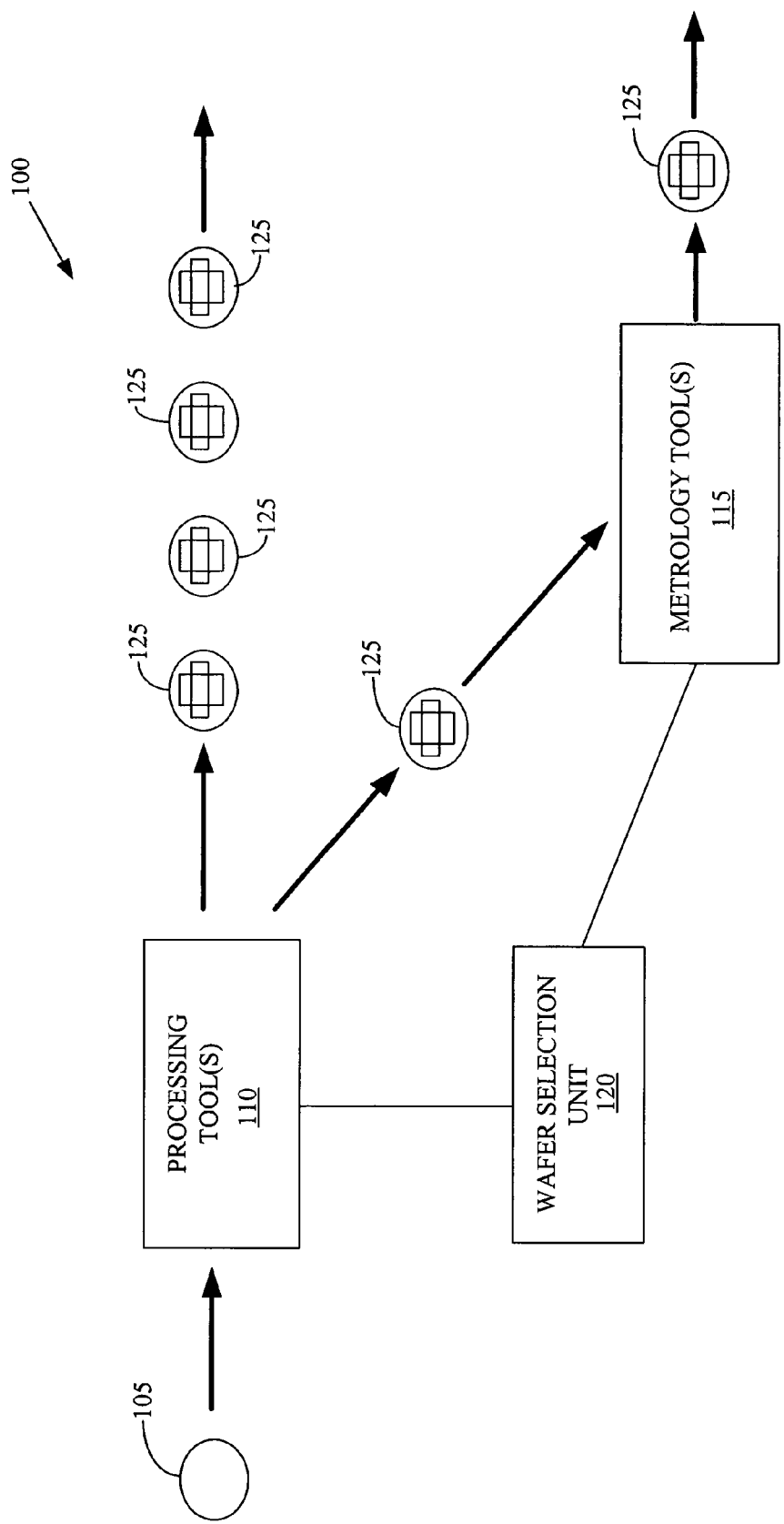
FIG. 1 shows a simplified block diagram of an illustrative manufacturing system, in accordance with the present invention.

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related sampling rules, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 shows a simplified block diagram of an illustrative manufacturing system 100. Although the invention is described as it may be implemented in a semiconductor fabrication facility, the invention is not limited to implementation in a semiconductor fabrication facility and may be applied to other manufacturing environments. In the illustrated embodiment, the manufacturing system 100 is configured to fabricate semiconductor devices in or on one or more wafer lots 105. The particular type of semiconductor devices, or products, formed in or on the wafers in the wafer lot 105 are not material to the present invention and, in various embodiments, may include any type of product. In various alternative embodiments, the techniques described herein may be applied to a variety of workpieces or manufactured items to form products including, but not limited to, microprocessors, memory devices, digital signal processors, application specific integrated circuits (ASICs), or other similar devices. The techniques may also be applied to workpieces or manufactured items other than semiconductor devices. Persons of ordinary skill in the art having benefit of the present disclosure should appreciate that, in various embodiments, the wafer lots 105 may represent individual wafers, multiple wafers, one or more wafer lots, or any other number and/or grouping of wafers.

The manufacturing system 100 includes one or more processing tools 110 that may be used to form one or more products, or portions thereof, in or on the wafers in the wafer lots 105. In the illustrated embodiment, the processing tools 110 are depicted as a single entity. However, persons of ordinary skill in the art should appreciate that the processing tools 110 may be implemented in any number of entities. Moreover, in various alternative embodiments, the manufacturing system 100 may include any number of processing tools 110 of any type, including lithography tools, deposition tools, etching tools, polishing tools, annealing tools, and the like. In the illustrated embodiment, the manufacturing system 100 also includes one or more metrology tools 115, which may be integrated or standalone metrology tools 115. For example, the manufacturing system 100 may include metrology tools 115 such as scatterometers, ellipsometers, scanning electron microscopes, and the like. Techniques for operating the processing tools 110 and metrology tools 115 are known in the art and, in the interest of clarity, only those aspects of the operation of these devices that are relevant to the present invention will be discussed further herein.

A wafer selection unit 120 is communicatively coupled to the processing tools 110 and the metrology tools 115. In the interest of clarity, the individual connections between the wafer selection unit 120 and the processing tools 110, as well as the connections between the wafer selection unit 120 and the metrology tools 115, are each depicted using a single line in FIG. 1. However, persons of ordinary skill in the art should appreciate that numerous interconnections may be used to communicatively couple the wafer collection unit 120 to the processing tools 110 and/or the metrology tools 115. Persons of ordinary skill in the art are able to configure the manufacturing system 100 to provide the required interconnections to establish a communicative coupling between the wafer selection unit 120, the processing tools 110, and the metrology tools 115. In various alternative embodiments, the wafer selection unit 120 may be implemented in a computing device such as a desktop computer, a laptop computer, and the like. However, persons of ordinary skill in the art should appreciate that, in alternative embodiments, portions of the wafer selection unit 120 may be implemented in any number of devices and/or locations.

In operation, the processing tools 110 process one or more of the wafers in the wafer lot 105 to form one or more processed wafers 125. For example, the processing tools 110 may be used to form one or more features (e.g., a gate electrode) and/or one or more devices (e.g., a microprocessor and/or a memory element) in or on the wafers in the wafer lot 105 to produce the processed wafers 125. The wafer selection unit 120 may select one or more of the processed wafers 125 for sampling by the metrology tools 115. In one embodiment, the wafer selection unit 120 selects processed wafers 125 based on one or more sampling rules associated with the sampling process. Exemplary sampling rules include, but are not limited to, sampling rules associated with a wafer sequence (e.g., every third processed wafer 125 should be selected, if possible), a processing sequence (e.g., a processed wafer 125 that has been processed by each of the processing tools 110 should be selected, if possible), and a metrology sequence (e.g., processed wafers 125 should be evenly distributed to each of the metrology tools 115, if possible).

In one embodiment, the wafer selection unit 120 may select one or more of the processed wafers 125 based on a jeopardy state associated with each of the sampling rules. A jeopardy state (or jeopardy count) indicates how many wafer lots have been processed since the associated sampling rule was satisfied by metrology performed on a wafer processed by the tool. For example, a processing tool that has processed 10 wafer lots since an odd wafer processed by the processing tool was provided to a metrology tool would have a jeopardy state of 10 associated with the sampling rule that at least one odd wafer should be sampled. The selected processed wafers 125 may be returned to the process flow after metrology has been performed. In one embodiment, the jeopardy state associated with the sampling rule may be set to zero after the metrology is performed on the selected processed wafer 125. In alternative embodiments, a jeopardy count that indicates the number of wafer lots that have been processed by a wafer tool (or set or tools or chamber in a tool) since metrology was performed on a wafer processed by the tool may also be used by the wafer selection unit 120. However, persons of ordinary skill in the art should appreciate that the jeopardy state or count may, in alternative embodiments, be based on individual wafers or any grouping of wafers or wafer lots.

Figure 2:
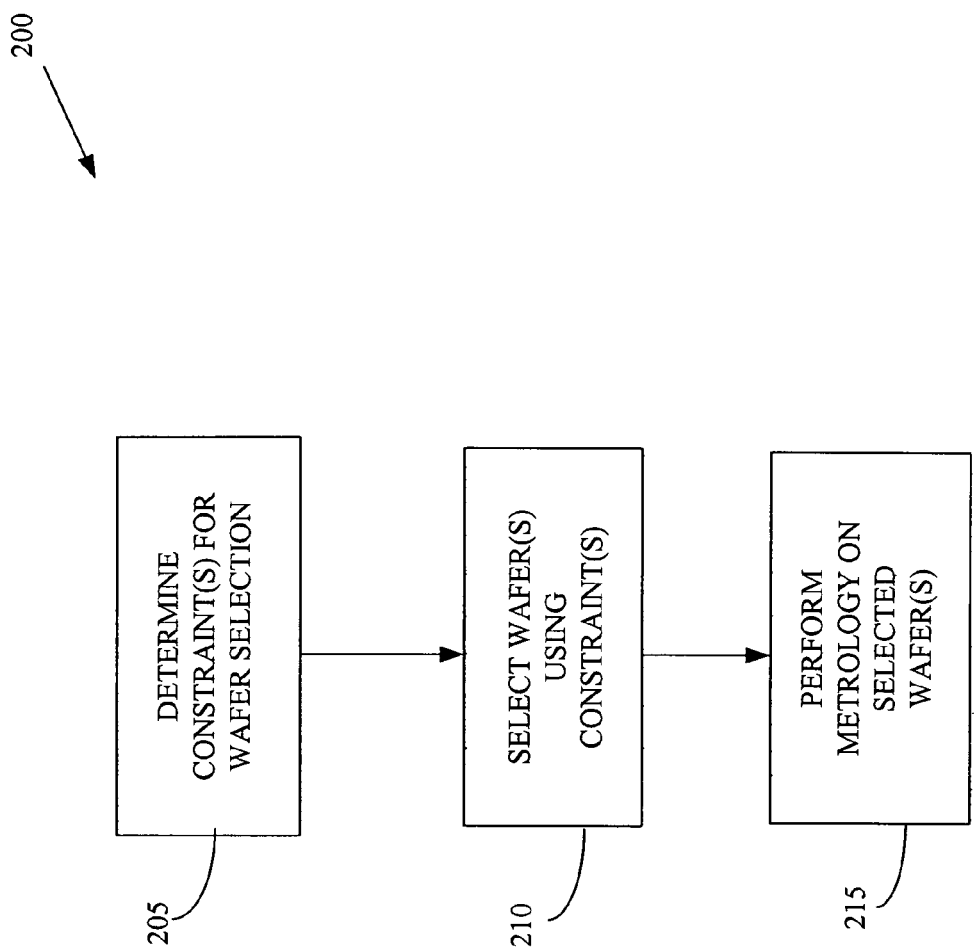
FIG. 2 conceptually illustrates one exemplary embodiment of a method of sampling selected wafers, in accordance with the present invention.

FIG. 2 conceptually illustrates one exemplary embodiment of a method 200 of sampling selected wafers. In the illustrated embodiment, one or more sampling rules for the wafer selection process are determined (at 205). For example, wafer selection may be constrained to sample at least one odd wafer and at least one even wafer, at least one wafer that has been processed in each chamber of a processing tool (e.g., chambers A, B, C), either wafer 7 or 19, at least three wafers with a hard sampling rule on sampling five wafers, and sampling all wafers over time in order based on a jeopardy state associated with each wafer.

TABLE 1

| Odd wafers | Even wafers | Total (soft) | Total (hard) | Select wafer | Ch. A | Ch. B | Ch. C |
|---|---|---|---|---|---|---|---|
| 1 | 2 | 1 | 1 | 7 | 1 | 2 | 3 |
| 3 | 4 | 2 | 2 | 19 | 4 | 5 | 6 |
| 5 | 6 | 3 | 3 |  | 7 | 8 | 9 |
| 7 | 8 | 4 | 4 |  | 10 | 11 | 12 |
| 9 | 10 | 5 | 5 |  | 13 | 14 | 15 |
| 11 | 12 | 6 | 6 |  | 16 | 17 | 18 |
| 13 | 14 | 7 | 7 |  | 19 | 20 | 21 |
| 15 | 16 | 8 | 8 |  | 22 | 23 | 24 |
| 17 | 18 | 9 | 9 |  | 25 |  |  |
| 19 | 20 | 10 | 10 |  |  |  |  |
| 21 | 22 | 11 | 11 |  |  |  |  |
| 23 | 24 | 12 | 12 |  |  |  |  |
| 25 |  | 13 | 13 |  |  |  |  |
|  |  | 14 | 14 |  |  |  |  |
|  |  | 15 | 15 |  |  |  |  |
|  |  | 16 | 16 |  |  |  |  |
|  |  | 17 | 17 |  |  |  |  |
|  |  | 18 | 18 |  |  |  |  |
|  |  | 19 | 19 |  |  |  |  |
|  |  | 20 | 20 |  |  |  |  |
|  |  | 21 | 21 |  |  |  |  |
|  |  | 22 | 22 |  |  |  |  |
|  |  | 23 | 23 |  |  |  |  |
|  |  | 24 | 24 |  |  |  |  |
|  |  | 25 | 25 |  |  |  |  |

Table 1 illustrates the exemplary sampling rules for a run (or lot) including 25 wafers. The odd and even wafers are listed in the first and second columns, respectively, and the integer (1) in the second row indicates that one wafer should be selected from each of the first and second columns. All of the wafers are listed in the third and fourth columns and the soft (3 wafers) and hard (5 wafers) sampling rules on the total number of selected wafers are indicated in the second row. Wafers 7 and 19 are listed in the fifth column and the integer (1) in the second row indicates that one of these wafers should be selected for sampling. The wafers that will be provided to channels A, B, and C, are listed in the sixth, seventh, and eighth columns, respectively, and the integers (1) in the second row indicate that one wafer from each of these groups should be selected for sampling. In one embodiment, jeopardy states ($x_s$) associated with each of the sampling rules may be listed in one or more additional columns.

One or more of the wafers are selected (at 210) for sampling based upon the wafer sampling rules and/or jeopardy states associated with the sampling rules. Accordingly, an iterative method may be employed to select (at 210) one or more of the wafers for sampling. For example, penalties for violating a sampling rule and/or awards for selecting a wafer may be summed and wafers having the largest value of the sum may be selected, as will be discussed in detail below. In one embodiment, a reward for selecting (at 210) a wafer for sampling may be a function of the jeopardy state. However, persons of ordinary skill in the art having benefit of the present disclosure should appreciate that other methods for selecting (at 210) a wafer for sampling may be used. For example, a mixed integer linear program may be used to solve the optimization problem and select (at 210) wafers for sampling. One or more of the selected wafers may be provided to one or more metrology tools and metrology may be performed (at 215) on the selected wafers. Once metrology has been performed (at 215) on the selected wafers, the selected wafers may be returned to the processing flow.

In some embodiments, one or more of the sampling rules may be violated by the wafer that is selected (at 210). Table 2 shows the results of a simulation in which the first, second, fourth, seventh, and eighth sampling rules were not violated, the third sampling rule was violated by 43.7% of the wafer selections, the fifth sampling rule was violated by 6.6% of the wafer selections, the sixth sampling rule was violated by 42.7% of the wafer selections, and the ninth sampling rule was violated by 10.5% of the wafer selections.

TABLE 2

| SAMPLING RULE | VIOLATION |
|---|---|
| 1 | 0.0% |
| 2 | 0.0% |
| 3 | 43.7% |
| 4 | 0.0% |
| 5 | 6.6% |
| 6 | 42.7% |
| 7 | 0.0% |
| 8 | 0.0% |
| 9 | 10.5% |

Figure 3:
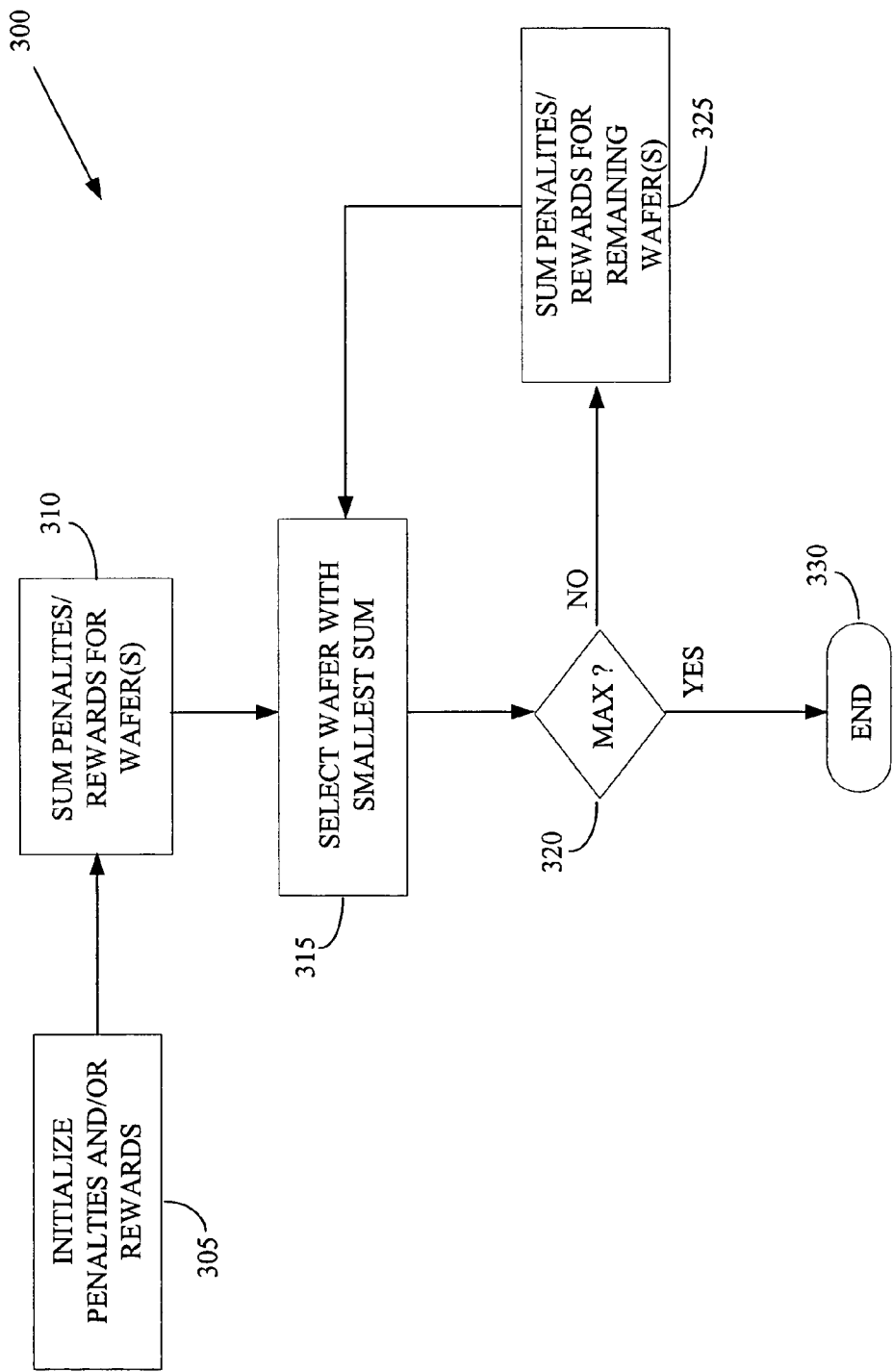
FIG. 3 conceptually illustrates one exemplary embodiment of a method of selecting wafers based on one or more sampling rules, in accordance with the present invention While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

FIG. 3 conceptually illustrates one exemplary embodiment of a method 300 of selecting wafers based on one or more sampling rules. In the illustrated embodiment, the method 300 begins with the assumption that no wafers have been selected. Penalties and/or rewards associated with selecting the various wafers are initialized (at 305). In one embodiment, penalties may be defined (at 305) for violating each of the sampling rules, such as the sampling rules shown in Table 1. For example, the penalties, $P_i$, may be defined as:

$$P_i = [10, 10, 0.75, 100, 10, 10, 10, 10, 10]^T.$$

However, persons of ordinary skill in the art having benefit of the present disclosure should appreciate that the penalties may be defined in a number of ways. In one embodiment, two more types of penalties may be used. For example, one penalty type is to penalize each sampling rule as a whole (P0). For example, if the sampling rules indicate that at most three wafers and five wafers are selected, then an objective penalty function may accrue a penalty of P0 for exceeding the three wafer limit, regardless of the size of the violation. A second penalty type (P1) is to accrue a penalty for the size of the rule violation. For the above example, the sampling rule is violated by two wafers (5 are selected, when only three were requested by the sampling rule) so that the penalty accrued by the objective penalty function would be 2×P1. The total penalties may be a combination thereof. In other alternative embodiments, multiple rules can also be combined into a single rule. For example, if sampling rules indicate that one wafer from slots 1-5 should be selected and one wafer from slots 21-25 should be selected, but there is no benefit to selecting only one or the other, these two rules could be combined into a single rule.

Rewards may also be assigned (at 305) for selecting wafers for metrology. For example, the rewards, $R_j$, may be defined as $R_j = \text{diag}(Q_j)X_j$, where Q is a state jeopardy vector and X is a vector that indicates the possible selections. The penalties and/or rewards associated with selecting each wafer are then summed (at 310). For example, the initial sum, J(0), of the penalties and rewards are listed in Table 3. The wafer having the smallest (i.e., the most negative value) of the initial sum of the penalties and rewards may be selected (at 315) for sampling, as indicated by the boldfaced box around the value J(0)=−34 associated with wafer 7.

Values of the sums of penalties and rewards for each wafer are then added and it is determined (at 320) whether or not this total value has reached a maximum. For example, the total for the initial set of penalties and awards is −589. In the first iteration, it may be assumed (at 320) that this value has not reached a maximum. If the total has not reached a maximum, then a new sum of penalties and/or awards, J(1), may be determined (at 325) for the remaining unselected wafers. The remaining wafer with the smallest value of the sum of penalties and rewards is selected (at 315). For example, wafer 8 may be selected because it has the smallest value of J(1)=−25. In the illustrated embodiment, the method 300 continues to select wafers 6, 25, and 13. However, comparing (at 320) the totals for the third and fourth iterations, J(3) and J(4), indicates that a maximum value for the total was reached in the third iterations. Accordingly, the wafers 6-8 are selected for sampling and the method 300 ends (at 330).

TABLE 3

| WAFER | J(0) | J(1) | J(2) | J(3) | J(4) |
|---|---|---|---|---|---|
| 1 | −23 | −3 | −3 | −3 | −3.75 |
| 2 | −21 | −21 | −1 | −1 | −1.75 |
| 3 | −23 | −13 | −13 | −3 | −3.75 |
| 4 | −22 | −12 | −2 | −2 | −2.75 |
| 5 | −22 | −12 | −2 | −2 | −2.75 |
| 6 | −24 | −24 | −14 | 0 | −0.75 |
| 7 | −34 | 0 | 0 | 0 | −0.75 |
| 8 | −25 | −25 | 0 | 0 | −0.75 |
| 9 | −23 | −13 | −13 | −3 | −3.75 |
| 10 | −21 | −11 | −1 | −1 | −1.75 |
| 11 | −23 | −13 | −3 | −3 | −3.75 |
| 12 | −22 | −22 | −12 | −2 | −2.75 |
| 13 | −25 | −5 | −5 | −5 | −5.75 |
| 14 | −22 | −22 | −2 | −2 | −2.75 |
| 15 | −23 | −13 | −13 | −3 | −3.75 |
| 16 | −23 | −13 | −3 | −3 | −3.75 |
| 17 | −21 | −11 | −1 | −1 | −1.75 |
| 18 | −22 | −22 | −12 | −2 | −2.75 |
| 19 | −32 | −2 | −2 | −2 | −2.75 |
| 20 | −24 | −24 | −4 | −4 | −4.75 |
| 21 | −23 | −13 | −13 | −3 | −3.75 |
| 22 | −23 | −13 | −3 | −3 | −3.75 |
| 23 | −22 | −12 | −2 | −2 | −2.75 |
| 24 | −21 | −21 | −11 | −1 | −1.75 |
| 25 | −25 | −5 | −5 | −5 | −0.75 |
| TOTAL | −589 | −345 | −140 | −56 | −69.75 |

In one embodiment, the method 300 may utilize a matrix formulation to select one or more wafers based on one or more sampling rules. For example, a class matrix, which includes one or more choices available for each sampling rule, may be defined. For example, the class matrix may include feasible choices for the sampling rules: Odd, Even, Every Wafer (Soft), Every Wafer (Hard), and Every Third Wafer. The class matrix, C, for these sampling rules may be written as:

$$C = \begin{bmatrix} 1 & 0 & 1 & 1 & 0 \\ 0 & 1 & 1 & 1 & 0 \\ 0 & 1 & 1 & 1 & 0 \\ \vdots & \vdots & \vdots & \vdots & \vdots \end{bmatrix}$$

The penalty vector including the sampling rule penalties may be defined as:

$$P_i = [10, 10, 1, 10, 10]^T.$$

The relatively large penalties (e.g., P=10) indicate that these sampling rules are relatively more important than the sampling rules associated with relatively small penalties (e.g., P=1). However, a person ordinary skill in the art should appreciate that the values (both absolute and relative) of the penalties are matters of design choice and not intended to limit the present invention.

A matrix may also be defined to indicate relational operators associated with each of the sampling rules. For example, a relational operator matrix, $\Psi$, may be defined as:

$\Psi = [1, 1, -1, -1, 1]^T.$

Values of $\Psi_i=1$ indicate that the relational operator associated with a sampling rule is greater than or equal to the sampling rule and values of $\Psi_i=-1$ indicate that the relational operator associated with that sampling rule is less than or equal to the sampling rule. For example, a value of $\Psi_1=1$ indicates that one or more odd wafers should be selected, if possible, and a value of $\Psi_2=1$ indicates that one or more even wafers should be selected, if possible. For another example, a value of $\Psi_3=-1$ indicates that three or less wafers should be selected, if possible, and a value of $\Psi_4=-1$ indicates that five or less wafers should be selected, if possible. For yet another example, a value of $\Psi_5=1$ indicates that one wafer out of every third wafer should be selected, if possible.

State jeopardy reward vectors may also be defined. For example, if all wafers are considered equal, then a state jeopardy reward vector, Q, may be defined as:

$Q = [1, 1, 1, 1, 1]^T.$

The possible measurement choices may be included in a vector, X, defined as:

$X = [0, 0, \ldots, 1, 0]^T$ and the number of wafer selections associated with each sampling rule may be defined in a vector, N:

$N = [1, 1, 3, 5, 1]^T.$

In this example, the wafer selection vector, N, indicates that at least one odd wafer should be selected, at least one even wafer should be selected, at most three wafers should be selected according to the soft sampling rule, at most five factors should be selected according to the hard sampling rule, and at least one of every third vector should be selected.

A violation matrix may be defined using the penalty and/or reward vectors described above. In one embodiment, the violation matrix, V, is defined so that a sampling rule violation is indicated by a value of $V_j<0$, i.e., a negative value of an element of the violation matrix. For example, the violation matrix, V, may be defined as:

$V = \text{diag}(\Psi)(C^T X - N).$

The size of a sampling rule violation may be measured using the value, SV, which is defined as:

$$SV = \frac{V - |V|}{2}.$$

For example, the size of the violation on the soft sampling rule would be equal to 1 if four wafers are selected for sampling.

A state penalty may also be defined. In one embodiment, the state penalty, J, is defined as:

$$J = C \text{diag}(P) \frac{V - |V|}{2} - (1_{n \times 1} - X) Q x_s,$$

and the total state penalty may be defined as the sum of all of the state penalties associated with each of the n wafers:

$$J = \sum_{i=1}^{n} J_i = J^T 1_{n \times 1}.$$

As discussed above, the wafer with the largest value of the state penalty may be chosen, and the process may be repeated to find the next best wafer. The selection process may end when the total state penalty increases when additional wafers are chosen.

Embodiments of the techniques described above for dynamically selecting wafers for metrology may have a number of advantages over conventional static sampling plans. For example, selecting wafers based on the processing history of the wafers in a wafer lot may allow wafers to be selected for metrology substantially after being processed. By waiting until the metrology step to determine the best wafers to measure, a real-time decision may then be made based on all the available data. The data that may be used to make the real-time decision may include information indicating which wafers have been previously measured, the tools and/or chambers in which the wafers for processed, and/or other user-specified selection criteria.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    determining measures of a plurality of sampling rule violations associated with a plurality of sampling rules, each measure indicating whether selecting one of a plurality of wafers for sampling satisfies or violates the corresponding sampling rule;
    selecting at least one of the plurality of wafers for sampling based on the measures of the plurality of sampling rule violations; and
    storing a sampling plan including information indicative of said at least one selected wafer.

2. The method of claim 1, wherein determining the measures of the plurality of sampling rule violations comprises determining a plurality of predicted jeopardy states associated with each sampling rule based upon at least one of a wafer sequence, a processing sequence, and a metrology sequence and determining the measures based on the corresponding jeopardy states.

3. The method of claim 1, wherein selecting said at least one wafer comprises selecting substantially all of the wafers in an order based on a jeopardy state associated with each sampling rule.

4. The method of claim 1, further comprising:
    accessing the sampling plan; and
    sampling, according to the sampling plan, at least one selected wafer using a metrology tool.

5. A method, comprising:
- determining measures of a plurality of sampling rule violations associated with a plurality of sampling rules, each measure indicating whether selecting one of a plurality of wafers for sampling satisfies or violates the corresponding sampling rule, wherein determining the measures of the plurality of sampling rule violations comprises assigning at least one penalty to each wafer when selection of that wafer violates a sampling rule and assigning a reward to each wafer when selection of that wafer satisfies a sampling rule;
- selecting at least one of the plurality of wafers for sampling based on the measures of the plurality of sampling rule violations; and
- storing a sampling plan including information indicative of said at least one selected wafer.

6. The method of claim 5, wherein assigning said at least one penalty comprises assigning at least one penalty based on a size of a sampling rule violation.

7. The method of claim 5, further comprising comprises forming a penalty vector based on the assigned penalties.

8. The method of claim 5, wherein assigning the reward associated with selecting each wafer comprises assigning a reward based on a jeopardy state associated with the wafer.

9. The method of claim 5, further comprising forming a reward vector based upon the reward associated with selecting each wafer.

10. The method of claim 5, wherein selecting said at least one wafer comprises summing the penalties and rewards associated with selecting each wafer.

11. The method of claim 10, wherein selecting said at least one wafer comprises selecting a first wafer by comparing the sums of the penalties and rewards for selecting each wafer.

12. The method of claim 11, wherein selecting said at least one wafer comprises selecting a plurality of wafers for sampling based upon an iterative calculation comprising:
- selecting the first wafer;
- removing the selected first wafer from a list a wafers that are available for sampling;
- summing penalties and rewards associated with selecting each of the remaining wafers;
- selecting a wafer for sampling based on the summed penalties and rewards;
- removing the selected wafer from the list; and
- repeating these steps until a predetermined criterion is satisfied.

13. An apparatus, comprising:
- at least one metrology tool for sampling wafers;
- a controller configured to:
  - determine measures of a plurality of sampling rule violations associated with a plurality of sampling rules, each measure indicating whether selecting one of a plurality of wafers for sampling satisfies or violates the corresponding sampling rule;
  - at least one of the plurality of wafers for sampling based on the measures of the plurality of sampling rule violations; and
- a memory element for storing a sampling plan including information indicative of said at least one selected wafer.

14. The method of claim 13, wherein the controller is configured to determine a plurality of predicted jeopardy states associated with each sampling rule based upon at least one of a wafer sequence, a processing sequence, and a metrology sequence and determine the measures based on the corresponding jeopardy states.

15. The apparatus of claim 13, wherein the controller is configured to select substantially all of the wafers in an order based on a jeopardy state associated with each wafer.

16. An apparatus, comprising:
- at least one metrology tool for sampling wafers;
- a controller configured to:
  - determine measures of a plurality of sampling rule violations associated with a plurality of sampling rules, each measure indicating whether selecting one of a plurality of wafers for sampling satisfies or violates the corresponding sampling rule, wherein the controller is configured to assign at least one penalty to each wafer when selection of that wafer violates a sampling rule and assign a reward to each wafer when selection of that wafer satisfies a sampling rule;
  - at least one of the plurality of wafers for sampling based on the measures of the plurality of sampling rule violations; and
- a memory element for storing a sampling plan including information indicative of said at least one selected wafer.

17. The apparatus of claim 16, wherein the controller is configured to assign at least one penalty based on a size of at least one sampling rule violation.

18. The apparatus of claim 16, wherein the controller is configured to form a penalty vector based on the assigned penalties.

19. The apparatus of claim 16, wherein the controller is configured to assign a reward based on a jeopardy state associated with the wafer.

20. The apparatus of claim 16, wherein the controller is configured to form a reward vector based upon the reward associated with selecting each wafer.

21. The apparatus of claim 16, wherein the controller is configured to sum the penalties and rewards associated with selecting each wafer.

22. The apparatus of claim 21, wherein the controller is configured to select a first wafer by comparing the sums of the penalties and rewards for selecting each wafer.

23. The apparatus of claim 22, wherein the controller is configured to select a plurality of wafers for sampling based upon an iterative calculation comprising:
- selecting the first wafer;
- removing the selected first wafer from a list a wafers that are available for sampling;
- summing penalties and rewards associated with selecting each of the remaining wafers;
- selecting a wafer for sampling based on the summed penalties and rewards;
- removing the selected wafer from the list; and
- repeating these steps until a predetermined criterion is satisfied.

24. The method of claim 18, wherein the controller is configured to form the sampling plan based on the selected wafers.

25. The apparatus of claim 24, wherein the metrology tool is configured to sample the selected wafers based on the sampling plan.

* * * * *